United States Patent
Povey et al.

(10) Patent No.: US 12,268,995 B2
(45) Date of Patent: Apr. 8, 2025

(54) USE OF ULTRASOUND AND ACOUSTICS TO CONTROL CRYSTALLISATION

(71) Applicant: LEWTAS SCIENCE & TECHNOLOGIES LTD, Oxford (GB)

(72) Inventors: Megan Povey, Huddersfield (GB); Kenneth Lewtas, Wantage (GB)

(73) Assignee: LEWTAS SCIENCE & TECHNOLOGIES LTD, Oxford (GB)

( * ) Notice: Subject to any disclaimer, the term of this patent is extended or adjusted under 35 U.S.C. 154(b) by 0 days.

(21) Appl. No.: 17/582,801

(22) Filed: Jan. 24, 2022

(65) Prior Publication Data

US 2022/0143528 A1 May 12, 2022

Related U.S. Application Data

(63) Continuation of application No. 16/083,337, filed as application No. PCT/EP2017/055353 on Mar. 7, 2017, now abandoned.

(30) Foreign Application Priority Data

Mar. 8, 2016 (GB) .................... 1603981

(51) Int. Cl.
*B01D 9/00* (2006.01)
*A23D 7/00* (2006.01)
(Continued)

(52) U.S. Cl.
CPC ........... *B01D 9/0081* (2013.01); *A23D 7/001* (2013.01); *A23D 7/02* (2013.01); *A23D 7/05* (2013.01); *A23G 1/0009* (2013.01); *A23G 1/0046* (2013.01); *A23G 1/18* (2013.01); *A23L 5/32* (2016.08); *B01D 9/005* (2013.01); *B01D 9/0063* (2013.01); *B01F 31/80* (2022.01); *C08F 6/26* (2013.01); *C08G 63/88* (2013.01); *C08G 69/46* (2013.01); *C10L 10/04* (2013.01);
(Continued)

(58) Field of Classification Search
CPC . A23D 7/05; A23D 7/02; A23D 7/001; C08G 63/88; C08G 69/46; B01D 9/0063; B01D 9/005; B01D 2009/0086; B01F 2101/505; A23G 1/0009
See application file for complete search history.

(56) References Cited

U.S. PATENT DOCUMENTS

2002/0031577 A1  3/2002  Arends et al.

FOREIGN PATENT DOCUMENTS

DE   19902302 A1   7/2000
EP      946232 B1   8/2001
(Continued)

OTHER PUBLICATIONS

"Tontechnic-Rechner—sengpielaudio". Available online at http://www.sengpielaudio.com/calculator-soundlevel.htm (Year: 2006).*

(Continued)

*Primary Examiner* — Donald R Spamer
*Assistant Examiner* — Assaf Zilbering
(74) *Attorney, Agent, or Firm* — The Dobrusin Law Firm. P.C.

(57) ABSTRACT

The use of ultrasound or acoustics applied at a level below that which causes cavitation to control the energy balance between particles and the liquid phase in a metastable liquid.

20 Claims, 3 Drawing Sheets

(51) Int. Cl.
    *A23D 7/02*         (2006.01)
    *A23D 7/05*         (2006.01)
    *A23G 1/00*         (2006.01)
    *A23G 1/18*         (2006.01)
    *A23L 5/30*         (2016.01)
    *B01F 31/80*       (2022.01)
    *B01F 101/00*     (2022.01)
    *C08F 6/26*         (2006.01)
    *C08G 63/88*       (2006.01)
    *C08G 69/46*       (2006.01)
    *C10L 10/04*       (2006.01)
    *C11B 7/00*         (2006.01)
    *C11B 15/00*       (2006.01)
    *F02B 51/06*       (2006.01)

(52) U.S. Cl.
    CPC ............ *C11B 7/0075* (2013.01); *C11B 15/00* (2013.01); *F02B 51/06* (2013.01); *B01D 2009/0086* (2013.01); *B01F 2101/505* (2022.01)

(56) References Cited

FOREIGN PATENT DOCUMENTS

| | | | |
|---|---|---|---|
| EP | 1509300 B1 | 10/2006 | |
| EP | 1409100 B1 * | 12/2009 | ............. A23D 7/001 |
| SU | 1192788 A | 11/1985 | |
| WO | 2007/013738 A1 | 2/2007 | |

OTHER PUBLICATIONS

International Search Report and Written Opinion from the European Patent Office for Application No. PCT/EP2017/055353 mailed Jan. 31, 2018.
UK Search Report and Written Opinion for Application No. GB1603981.0 mailed Sep. 29, 2016.
Sound Power, Available on at http://www.engineeringtoolbox.com/sound-power-level-d_58.html. (year 2003).
Tontechnic-Rechner-sengpielaudio (sengpielaudio) Available online at http://sengpielaudio.com/calculator-soundlevel.html (year:2006).

* cited by examiner

USE OF ULTRASOUND AND ACOUSTICS TO CONTROL CRYSTALLISATION

The present invention relates to the use of ultrasound and acoustics to control the crystallisation of materials from the liquid phase (from either solution or the melt). Crystal formation can be considered in three stages, (i) the clustering of molecules into a pre-nucleation embryonic (unstable) state of indeterminate structure, (ii) the formation of crystal nuclei with a definite structure and the potential to create a site for crystal growth and then (iii) the growth of the crystal from the so formed nucleus. There is a metastable phase between the saturation limit and the viable nucleation limit. (A review of nucleation can be found in: Davy, Schröder & ter-Horst, Angew. Chem. Int. Ed., 2013, 52, 2-16). The use of ultrasound is known to stimulate the crystallisation of materials and in particular, to provide the energy change required to promote the nucleation, this phenomenon is sometimes known as sonocrystallisation. The use of non-cavitational ultrasound to stimulate crystal formation in the metastable phase of a supercooled liquid has also been proposed.

Considering only the crystal nucleation (as described above) and crystal growth stages, in the nucleation stage submicroscopic viable crystal nuclei are formed from associating pre-embryonic clusters (as illustrated in FIG. 1 hereto) which develop into larger crystals during the subsequent growth stage. With homogenous nucleation, the crystals are formed directly from the liquid. Heterogeneous nucleation is nucleation mediated by foreign particles already present in the liquid. Secondary nucleation is nucleation mediated by pre-existing crystals. Epitaxial nucleation is when one species nucleates on the already crystallised surface of another species. The present invention relates to all aspects of nucleation.

Crystal formation begins to occur in the metastable phase of a supercooled liquid. Firstly embryos of crystals are formed, followed by nucleation of the crystals and subsequently crystal growth. The temperature, concentration and pressure at which these events occur and the speed at which they take place have an important impact on the performance and properties of many industrial products. For example, the temperature and cooling rate at which alkane waxes crystallise from hydrocarbon fuels, particularly diesel fuels and heating oils, has a significant impact on their ability to maintain fuel flow at low temperatures. In another industry the crystal habit of triglyceride fats and oils have a significant impact on their use in foodstuffs and their formation process can also adversely impact their flavour and other sensory properties. The crystallisation of thermoplastic organic polymers, such as polyolefins, polyesters and polyamides, and co- and ter-polymers, such as ethylene vinyl acetate copolymers, impacts many of the properties, such as mechanical, optical and barrier properties, for example, the clarity of articles such as films produced therefrom. Furthermore, the rate of crystallisation of such thermoplastics can impact the speed at which they can be melt processed such as in extrusion and moulding processes, for example: film formation, coatings, injection moulding, blow moulding, thermoforming, etc. Similarly the size, number and form of crystals forming the waxes significantly impacts their properties.

Benefits of sonocrystallisation that have been reported in literature include:

Faster nucleation and uniform nucleation throughout the sonicated volume.

Relatively easy nucleation of materials for which nucleation can be difficult otherwise.

Generation of smaller, purer and more uniform crystals.

All these reports involved sonication above the cavitation threshold.

When a liquid is exposed to ultrasound, microscopic gas/vapour bubbles may be formed within the liquid which show a dynamic pulsating behaviour. One result of such ultrasound-induced bubble behaviour is known as cavitation. When the bubbles do not perish but exhibit stable volume and/or shape oscillations cavitation is denoted as "stable" or "non-inertial" cavitation. When the ultrasound intensity is increased and exceeds a certain limit, the cavitation threshold, the nature of cavitation changes which results in the bubbles becoming unstable. A cavity shows rapid growth over many sound cycles followed by a violent collapse within a fraction of a sound cycle. The collapsing gas bubbles produce very high pressures and temperatures locally in the bubble as well as a high pressure in the liquid layer surrounding the bubble. Cavitation which shows this violent bubble behaviour is denoted as "transient" or "inertial" cavitation.

Cavitation occurs when the pressure gradient developed by the time and spatial varying pressure field, which comprises ultrasound, exceeds the intermolecular bond strength of a fluid medium in which the ultrasound is propagating. Once a "cavity" is nucleated, it then grows by a process called "rectified diffusion". In this process gas is pumped into the cavity over very many cycles of the pressure created by the ultrasound. This is due to the fact that the surface area is largest at peak expansion when gas diffuses from the fluid into the cavity whilst the surface area is smallest on the contraction phase when the Laplace pressure is largest. This means that gas is gradually pumped into the cavity which grows into a bubble. As the bubble grows the interior Laplace pressure falls until the partial pressure of the dissolved gases in the surrounding medium exceed it, at this point the bubble collapses explosively in the process called cavitation. Under certain conditions bubbles can oscillate stably without collapse for many cycles in a process contradictorily called "stable cavitation".

It has previously been believed that the physical mechanism underlying sonocrystallisation and the benefits resulting from it are due to the occurrence of transient cavitation and it has been stated that without transient cavitation the benefits of sonocrystallisation will not be realised.

However, it has been shown that non-transient or stable cavitation can also induce sonocrystallisation. See for instance Chow, R C, D Atkins, S Singleton, R Mettin, B Lindinger, T Kurz, W Lauterborn, M Povey, and R Chivers. 2006. "High-Speed Observations of the Nucleation of Ice by Power Ultrasound." Water Properties of Food, Pharmaceutical, and Biological Materials 9: 613-622.

For example WO 92/20420 describes a method and a device for the control of solidification in liquids. The liquid to be solidified is subjected to inter alia ultrasonic cavitation in order to control the steps of nucleation and/or crystal growth of the solidification process. The ultrasonic conditions are chosen such that transient cavitation results to cause nucleation formation. This requires the use of high intensity ultrasound.

EP 765605 deals with the effect of ultrasonic treatment on fat nucleation. It describes a method for accelerating the polymorphic transformation of edible fat compositions. Such compositions when undercooled by at least 4° C. are exposed to ultrasonic energy for a time and at a frequency sufficient to induce nucleation of stable polymorph crystals without exceeding the melting point of those crystals. Typical fats to be treated by this method are butter fat and the fats used in ice cream, chocolate, margarine and yoghurt.

EP 765606 describes a method for retarding fat blooming on chocolate and on other confectionery fat compositions comprising cocoa butter. The method comprises undercooling the molten fat by at least 3° C. below the melting point of the β-polymorph crystal. By exposing it to an effective amount of ultrasonic energy stable crystals are generated.

This use of sonocrystallisation to stimulate crystallisation is discussed in Crystallisation Nuclei in Liquid in a Sound Field in the J. Heat Mass Transfer, Vol 25, No. 2, pp 289-300, (1983) by V. A. Akulichev and V. A. Bulanov. In Russian patent 1192788 ultrasound is used to enhance the precision of the analysis of biological fluids of low concentration by determination of the initiation of crystallisation for comparison with that of a standard fluid.

In crystallisation, the metastable state exists in a zone of temperature/concentration/pressure depending on the nature of the liquid that is being cooled or heated (as illustrated in FIG. 2 hereto). In this zone there are pre-embryonic associated clusters of molecules that have not yet achieved a viable critical nucleus sizes. These clusters may grow to achieve viable crystal nucleus size or "dissolve or melt" back into the solution or melt. We have now found that the use of ultrasound of a certain power and frequency can control the metastable state and can inhibit or promote nucleation and thereby control the width of the temperature/concentration/pressure zone defining the metastable state for crystallisation from liquids, both solutions and melts. This effect should be effective in all crystallising systems but particularly the crystallisation of organic molecules which are not dominated by ionic bonds, as the liquids are cooled, concentrated or subjected to increased pressure. Accordingly the use of ultrasound can enable a control of the crystallisation, not only through control of the growth of nuclei but also under the correct conditions, the shrinking or melting or dissolution of small pre-embryonic clusters, embryos, nuclei or crystals, to enable the control of the number of crystals formed and the sizes and habits (and possibly morphologies) of the crystals.

The metastable phase consists of clusters of molecules, which are initially extremely small, within a liquid matrix. There is an energy flux between the particle and the liquid phase and the incidence of crystal formation and the speed of crystallisation is determined by the nature of this energy flux which is characterised by the continuous appearance and disappearance of the 'particles' together with spatial and temporal fluctuations in pressure, temperature, density and elastic properties whilst the overall energy and temperature of the system remains roughly constant. The particle appearances and disappearances are associated with temperature fluctuations of the order of the product of the Boltzman constant $k_B$ and the absolute temperature T. The application of non-cavitational ultrasound or acoustics imposes a direction on this flux which depending upon the strength of the intermolecular bonding, causes an energy flow into or out of all the particles together so that the various fluxes no longer cancel each other out, allowing energy to flow into or out of the particles in synchronicity with the applied acoustic pressure fluctuation.

We have found that this energy balance can be controlled by the selective application of ultrasound to the liquid when it is in the metastable zone provided the ultrasound or acoustics is applied at a level below that which causes cavitation. We have found that this is particularly the case with molecules which are not dominated by ionic bonding such as organic materials such as alkanes and glycerides and in particular thermoplastic polymers, such as polyolefines, polyamindes and polyesters, and semi-crystalline co- and ter-polymers.

By control we mean that by the use of the appropriate level of ultrasound/acoustic, frequency, power and duration according to the nature of the crystallising material the crystal formation can be promoted or suppressed. We also mean that the use of the appropriate level of ultrasound/acoustics can control the rates of nucleation and/or crystallisation and/or the numbers, sizes or habits and/or the morphology of the ultimate crystals that are formed.

It has been proposed to apply ultrasound to the metastable phase of cooling materials such as for example in United States patent application publication number US 2003/0031577 which specifies that the ultrasound be used at a level below that at which cavitation occurs. US 2002/0031577 is however concerned only with increasing the rate of crystallisation of triglyceride materials used in foodstuffs. US 2002/0031577 does not suggest that by careful selection of the frequency, power and optionally duration of the ultrasound treatment crystallisation may be suppressed, or enhanced or that the control of crystallisation by the application of the ultrasound when the liquid is in the metastable zone can determine the ultimate crystal numbers, sizes, habits and/or form or that nuclei can be maintained in a given polymorph whilst in the metastable zone. Such control may require a method of monitoring the concentration of nuclei such as an ultrasound spectrometer.

The choice of the power, frequency and optionally the duration of the ultrasound/acoustic treatment to be used in this invention will depend upon the medium that is to be treated and, in some instances, on the nature of the crystals that are desired to be produced. It is however important that the selection of the conditions according to the medium that is to be treated (such as pressure including vacuum, temperature and previous treatment history) are such that cavitation in the medium is avoided. As previously described cavitation is when a liquid is exposed to ultrasound, microscopic gas/vapour bubbles are formed which show a dynamic pulsating behaviour. As previously described cavitation causes a large release of energy which impacts the energy balance between the forming particles and the liquid matrix that this invention controls and must therefore be avoided.

United States patent publication number US 2002/0031577 describes how an ultrasound treatment system may be operated to avoid cavitation and also describes techniques that may be employed to avoid cavitation as follows.

According to US 2002/0031577 an indicator for the absence of transient cavitation is the value of the mechanical index (M) of the actual ultrasound generating system. The MI is defined as $$MI = (\rho_{NEG}[MPa])/\sqrt{f[MHz]}$$

where $\rho_{NEG}$[MPa] is the amplitude of the acoustic pressure of the ultrasound field (the pressure amplitude) and f[MHz]] is the ultrasound frequency. The MI can be used as an indicator for the likelihood of the occurrence of inertial cavitation. MI has been adopted by the American Institute of Ultrasound in Medicine as a real-time output to estimate the potential risk of cavitation so that it can be avoided during diagnostic in vivo ultrasound scanning. It has been stated that transient cavitation does not occur when the MI of the applied system does not exceed the threshold value 0.7. Hence, frequency and pressure amplitude of the ultrasound are preferably chosen such that this threshold value is not exceeded. Since the sound intensity (I) is related to the pressure amplitude $P_{NEG}$ according to the function $$I = P_{NEG}^2 / (2\rho c)$$

the ultrasound intensity should not exceed the corresponding intensity threshold value, where ρ (rho) is the liquid density and is c the velocity of sound, which values in fat at 20 C are about 920 kg/m3 and 1400 m/s respectively (and in water are similar).

The MI based threshold indicator is meant to distinguish riskless, medically safe sonication conditions from conditions where dangerous transient cavitation might, but not necessarily, will occur. It precisely indicates the absence of transient cavitation, but less precisely indicates the presence of transient cavitation. US 2002/0031577 A1 prefers to operate at an MI value of 0.09 (see Example 3). We have found that use of ultrasound gives improved control of crystallisation from liquids in general by employing ultrasound without cavitation, furthermore we have found that using ultrasound with an MI value below 0.09 enables improved control of crystallisation from liquids and in particularly the crystallisation of triglycerides. In particular we can promote or inhibit nucleation and can get improved control of crystal number size and habit employing these preferred conditions according to the liquid being processed. Preferred values of MI are therefore 0.07 or below, more preferably 0.05 or below, particularly when treating triglycerides.

Transient cavitation can also be detected by an alternative method which comprises monitoring with a hydrophone the sound radiated by an ultrasonication cell. The hydrophone is a device which transforms sound energy emitted from a sonication cell into oscilloscope views. These views will demonstrate the onset of transient cavitation by the appearance of peaks of characteristic harmonics and subharmonics and eventually the appearance of "noise" which belongs to full cavitation. The harmonics and sub-harmonics result from the non-linear volume oscillations of strongly driven cavitation bubbles. The shock waves produced by imploding bubbles become visible because they create broad-band pulses in the frequency spectrum. The superposition of many such signals from all bubble implosions generated by a cavitating sound field gives rise to a broad-band "noise" signals pattern. Hence, such noise pattern points to the many violent bubble collapses which are characteristic for transient cavitation. By contrast, bubble oscillations during stable, non-transient cavitation do not show a noise pattern in the hydrophone view although stable bubble oscillation may continue to show in the form of the characteristic harmonics and sub harmonics referred to above. The presence of stable cavitation can also be detected by this means, in this case characteristic harmonics and subharmonics appear but the 'noise' associated with transient cavitation is absent.

The sonocrystallisation process of the present invention employs low intensity ultrasound such that a hydrophone, when detecting sound radiated from the ultrasound exposed liquid, shows a signals pattern which is free from broad-band cavitation noise and from characteristic harmonics and subharmonics.

A preferred embodiment of the present invention is characterized by the ultrasound intensity being at such a low level that a hydrophone when detecting sound radiated from the ultrasound exposed liquid shows a view with a main signal corresponding with the main radiation frequency and a further signal corresponding with the first subharmonic frequency where the intensity peaks ratio of the further signal and the main signal, the peaks ratio AS/AF, is <0.5.

Most preferably the invention employs an ultrasound intensity that is at such a level that a hydrophone when detecting sound radiated from the ultrasound exposed liquid shows a view with a single signal corresponding with the main radiation frequency without substantially showing additional signals corresponding with subharmonics frequencies.

The ultrasound/acoustic treatment according to the present invention imparts a pressure fluctuation to the molecules in the undercooled metastable fluid medium with which it interacts causing density and temperature fluctuations in step with the applied ultrasound/acoustic pressure field. In a supersaturated liquid medium there is usually an energy difference between the molecules in particles within the liquid medium and the molecules of the liquid medium. As the material converts from a liquid to a solid (as in nucleation and crystal growth) energy is released, heating the surrounding fluid. Accordingly the crystallisation in the metastable phase involves complex energy flux. Depending upon the system, the surface energy of the interface between particles suspended in the liquid medium may be greater or lower than the volume energy (latent heat of fusion) of any particles that are present in the liquid medium.

We have found that by careful selection of the ultrasound conditions that are applied to the system according to the liquid being treated the energy difference between the liquid medium and the particles can be controlled to provide control over the temperature of the onset of crystallisation and also the rate of crystallisation. For example, the ultrasound conditions may be chosen to impart greater energy to the liquid medium than to the particles or vice versa. Either way provides an impact and control over the onset of formation of crystals and the rate of formation of crystals and their size and shape following the onset of crystallisation.

The intensity of the ultrasound that should be used to achieve the effect of this invention depends on the liquid being processed and the size of the vessel in which it is contained. However we have found that for vessels as large as 10 metres in diameter and as small as 100 micrometre in diameter and if we take the speed of sound as varying between 500 and 3000 m/s, assuming that the vessel diameter is at least one wavelength (v=fxlambda) and at most 5 wavelengths then the preferred frequency range is between f=500/10=50 Hz (Acoustics) and f=3000×5/(100×10−6)=150 MHz (Ultrasound).

The Power level of the ultrasound is defined in terms of peak power, average power and duty cycle and we prefer that the Peak Power is below the cavitation limit in water so below 5 kWm$^{-2}$.

We also prefer that the average Power is below the cavitation limit in water so also below 5 kWm$^{-2}$.

However, when working with certain systems it may be desirable to increase power levels to suppress nucleation in which case we would want to go up to the cavitation limit of 10 kWm$^2$.

The duty cycle is defined as the ratio of the time during which acoustic power is applied to the total time during which the pulsed signals are applied and the invention requires the use of pulsed signals with more than 10 cycles. We prefer to use greater than 1000 cycles up to and including constant application of ultrasound/acoustic power.

Processing conditions other than the ultrasound/acoustic intensity such as time, temperature and pressure can be optimized by some trials. It has been found, e.g. that for ultrasound crystallisation of anhydrous milk fat the intensity optimum is just below the cavitation threshold.

Generally, a too long exposure of the crystallized fat to ultrasound/acoustics may cause a collapse of the crystal structure.

We prefer to employ ultrasound at an MI value of less than 0.08 and preferably less than 0.05.

In principle, the present invention is suitable for the sonocrystallisation of all kinds of liquids but it is particularly effective when cooling has proceeded so far that the system has become supersaturated. The invention has been found to be particularly useful for use with triglyceride oils either being of vegetable or of animal origin or being a mixture of both. Preferably, the triglyceride oil is of vegetable origin and is selected from the group consisting of rapeseed oil, palmkernel oil, sunflower oil, groundnut oil, mustard oil, safflower oil, sesame oil, corn oil, soybean oil, cottonseed oil, linseed oil and olive oil. Oils having an animal origin include marine oils and milk fat. The invention has been found to be particularly useful in the tempering of chocolate.

Preferably the fats are unmodified, but also modified fats such as hydrogenated fats or fats which have been subjected to interesterification or transesterification will benefit from the present invention.

A preferred embodiment of the present invention is a process for fractionating a triglyceride fat, which comprises the steps of:

a. when the fat is solid, heating the triglyceride fat until no substantial amount of solid triglyceride fat is present in the oil,
b. allowing the triglyceride oil to cool to below its melting point and during step b. controlling the crystallisation by exposing the cooling material to selective ultrasound according to this invention resulting in a solid (stearin) fraction,
c. recovering the stearin fraction by separating it from the olein fraction, Another embodiment of the invention involves de-tempering of chocolate melt during re-work. This comprises the application of acoustic power which melts the crystalline material produced in the tempering operation permitting the heating of the liquid oil suspending phase to a lower temperature, thereby greatly improving the economy of chocolate manufacture.

Other applications of the invention relate to processes for the preparation of edible emulsion spreads which may be either water continuous or fat continuous. The most common spreads such as margarine have a continuous fat phase and a dispersed aqueous phase. Such spreads are traditionally prepared by passing a mixture of the aqueous phase and the oil phase through a series of one or more scraped-surface heat exchangers and pin stirrers. The oil phase of those mixtures is eventually crystallized by cooling under such shear that a plastic water in oil emulsion is obtained in which a lattice of fine fat crystals provides the desired consistency and stabilizes the dispersed aqueous phase.

Alternatively the process of spread preparation may start with a continuous aqueous phase emulsion and includes a phase inversion step in order to impart fat continuity to the emulsion spread.

The lattice of fat crystals in the spread necessarily consists of solid fat with elevated levels of saturated fat. For reasons of healthy nutrition and economy of raw materials the content of such saturated fat preferably is restricted to the minimal functional amount. The use of ultrasound according to the present invention has shown to have such a beneficial influence on nucleation and eventually on the strength of the crystal lattice that even at relatively low solid fat levels a spread product with a good consistency, texture and stability is obtained.

A typical vessel suited for implementation of the invention with fats as described is equipped with proper means for heat exchanging, for stirring the vessel content, for applying the desired amount of ultrasound energy. Alternative equipment can be arranged with devices which equally will allow the invention to be carried out. The sonication vessel could be filled via a pre-cooling unit; the sonication being started either in that unit or in the tube conducting the liquid to be crystallized to the main crystallisation vessel.

The invention is also useful in the processing of hydrocarbon liquids and solids such as crude oils, fuels, lubricants and waxes. These liquids contain significant proportions of normal alkanes typically containing, in the case of distillate fuels, from 12 to 30 carbon atoms and these alkanes crystallise out from solution at temperatures below their "cloud points". This is particularly the case with diesel fuels and heating oils where the crystals tend to form as large plates which can gel the fuel, block filters and vehicle fuel lines. Traditionally additives, particularly low molecular weight polymers, have been added to the fuels to reduce the size of the crystals and alter their habits in order to enable the fuel to flow. If the crystals are small enough they will dissolve more easily once the temperature of the bulk fuel is increased due to operation of the vehicle or the fuel heating system. The use of ultrasound according to this invention may be employed at different positions in a system or vehicle, e.g. the fuel tank, the filter element, the high pressure common rail, etc., to enhance the effect of or to avoid or reduce the need for expensive additive or to reduce the power required to be supplied to the fuel heating system or it may eliminate the need for a fuel heating system altogether.

The most important thing is for the system to operate without failure (e.g. a diesel vehicle). This may be tested by operating a vehicle in cold conditions or using an industry standard test such as the Cold Filter Plugging Point (CFPP) which has become a standard requirement in the specification of such fuels particularly for use in winter and the Simulated Filter Plugging Point Test (SFPP) and the Low Temperature Flow Test (LTFT) which use slower cooling rates than the CFPP.

The subject of this invention can enable the operation of fuel (or crude oil, lubricating oil, fuel oil, waxes, etc.) without the need for additives, or with a reduction in the amount of additives required, to enhance the effect of additives or the use of different additives. The use of ultrasound can both depress the temperature of crystal formation and also following the onset of crystal formation it can control the number, size and shape of the crystals formed both effects enabling the operation at low temperatures.

Accordingly the provision of a source of ultrasound in the tank take-off chamber or close to the location of the feed of the fuel through filters to the engine or heating boiler and optionally operated by (i) the ignition of the vehicle or boiler (ii) a detector or temperature measurement or (iii) a predetermined trigger point, has been found to enable the use of un-additised or low additive treatment fuel in environments where previously the use of additives has been required. Alternatively it may be used to enhance the effect of additives.

The liquid that is treated with ultrasound according to this invention may be a naturally occurring liquid such as for example a hydrocarbon fuel such as a diesel fuel. Alternatively it may be molten material such as for example molten waxes, natural oils and fats such as triglycerides. In another embodiment the molten material may be a molten organic or polymeric material such as thermoplastic materials such as polyolefines comprising homopolymers and copolymers or terpolymers of ethylene, propylene and other unsaturated organic compounds which crystallise from the melt. In this embodiment the use of ultrasound according to this invention has been found to be particularly useful in the melt processing of such thermoplastic polymers for example by extrusion, coating, or moulding applications. Subjecting the melt to ultrasound according to this invention just prior to extrusion or injection into a mould will control crystal size and habit and thereby improve the mechanical, optical and transport properties, for example, the clarity of extruded articles such as polymer films and will also allow the throughput such as the speed of the extrusion or injection activity to be increased.

The invention is also useful in many other liquid-solid phase changes such as, but not limited by, the crystallisation of pharmaceutical materials to form small crystals of desired polymorphs, energetic materials to directly produce crystals of the desired sizes and habits, polymers to control crystallite nucleation and size, agrochemical materials to control crystal size and habits, semi-conductor crystallization to achieve the desired properties, phase-change materials to control the temperature of the phase change, etc.

Additionally the invention is particularly useful in controlling crystallisation of waxes. Hydrocarbon waxes are low molecular weight typically of carbon chains from C8 to C100 polyalkanes and are used in many applications such as polymer processing, providing adhesion and flow in adhesive formulations, in coatings such as waterproofing in polishes. The ability to control the crystal size of the wax provided by this invention enables greater control of the performance provided by the wax in the particular use. For example smaller wax crystal size in adhesives can lead to improved adhesion for a given amount of adhesive.

Figure 1:
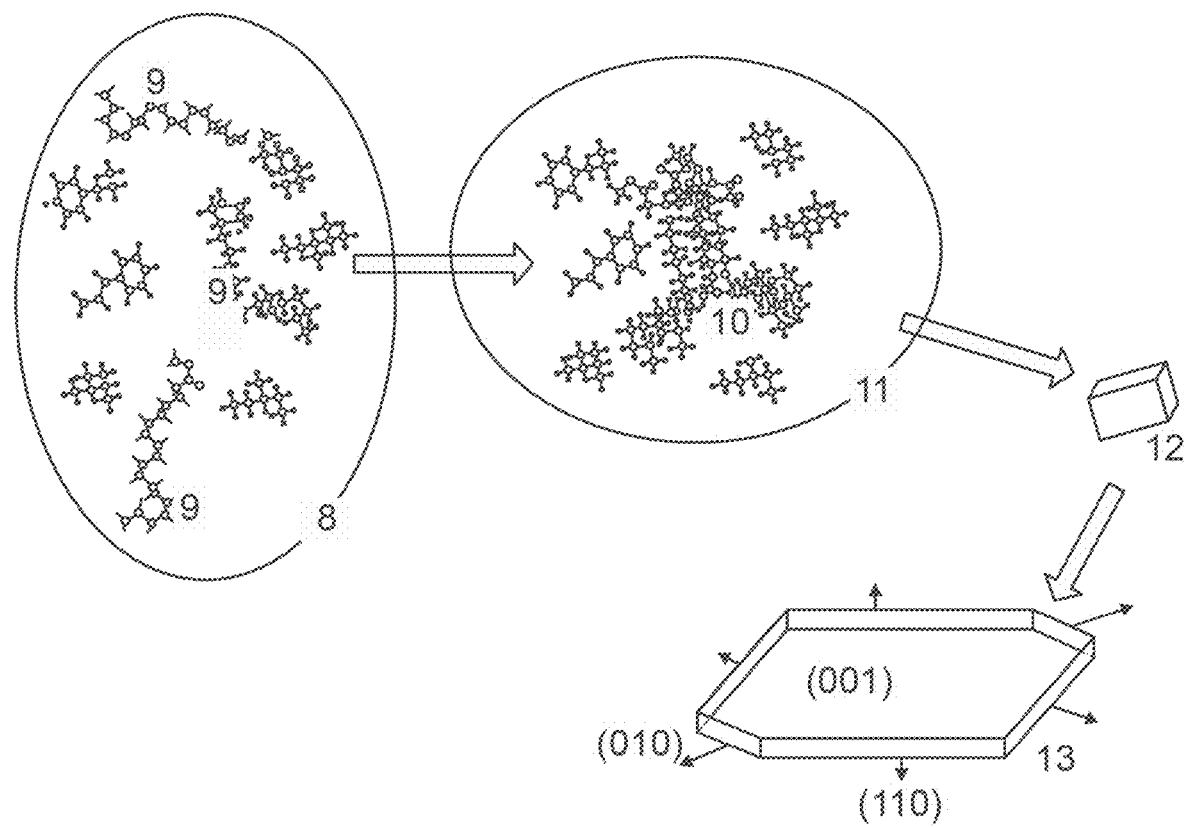
FIG. 1 shows solute molecules in solution, formation of solute molecule clusters, and conversion of the same to crystals.
Figure 2:
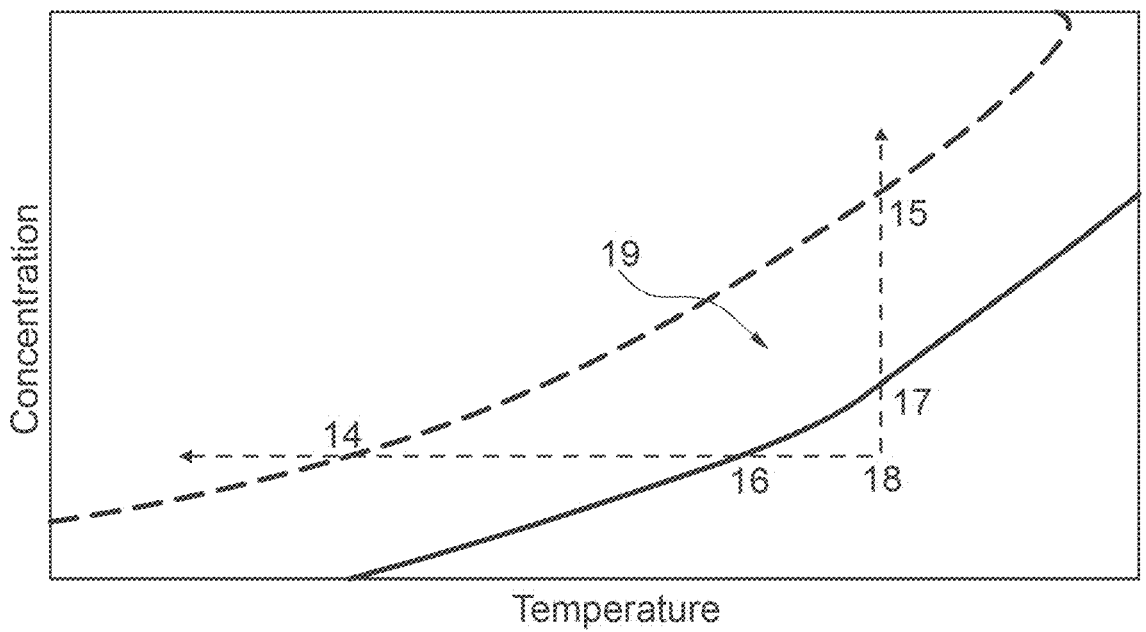
FIG. 2 is a plot of a concentration of a solution against temperature.

The clustering of molecules in the Metastable Zone is illustrated in FIG. 1 and FIG. 2 illustrates the Metastable Zone Width.

FIG. 1 shows in Zone 8 solute molecules in solution and shows how the molecules (9) form clusters (10) in the liquid medium (11) which subsequently convert to crystals (12) once a critical nucleus (13) is formed.

FIG. 2 is a plot of the concentration of a solution against temperature and shows a solution (18) and the metastable zone (19) between kinetic crystallisation [curve 14/15] and thermodynamic dissolution [curve 16, 17] and it is in this zone (19) that ultrasound is applied according to this invention resulting in the control of the number of crystals formed, the size and habit of the crystals and perhaps their morphology, The invention is illustrated by reference to the following Example.

The apparatus used in this Example is shown in the accompanying Figures.

Figure 3:
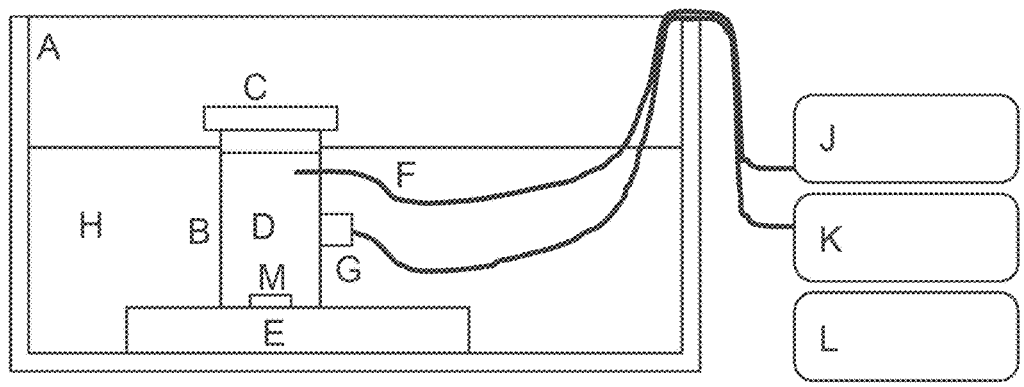
FIG. 3 is a schematic drawing of an apparatus according to the present teachings.

FIG. 3 is a schematic drawing of the apparatus in which

A Circulating cooling bath

B Sample cell (see detailed figure)

C Clear lid

D Sample under investigation

E Stand (allowing coolant circulation) and magnetic stirrer plate

F 4 wire resistive temperature device (PT-100)

G Ultrasound transducer

H Coolant

J Temperature display and logging

K Amplifier

L Waveform synthesiser

M Magnetic stirrer

Figure 4:
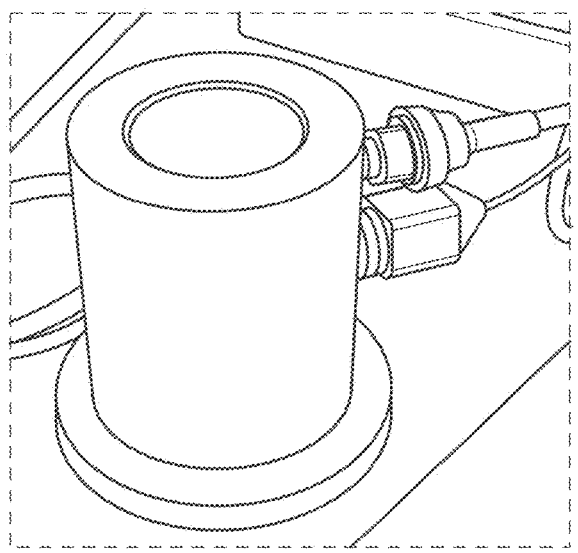
FIG. 4 shows the ultrasound cell of FIG. 3.

FIG. 4 shows the ultrasound cell B of FIG. 3.

Figure 5:
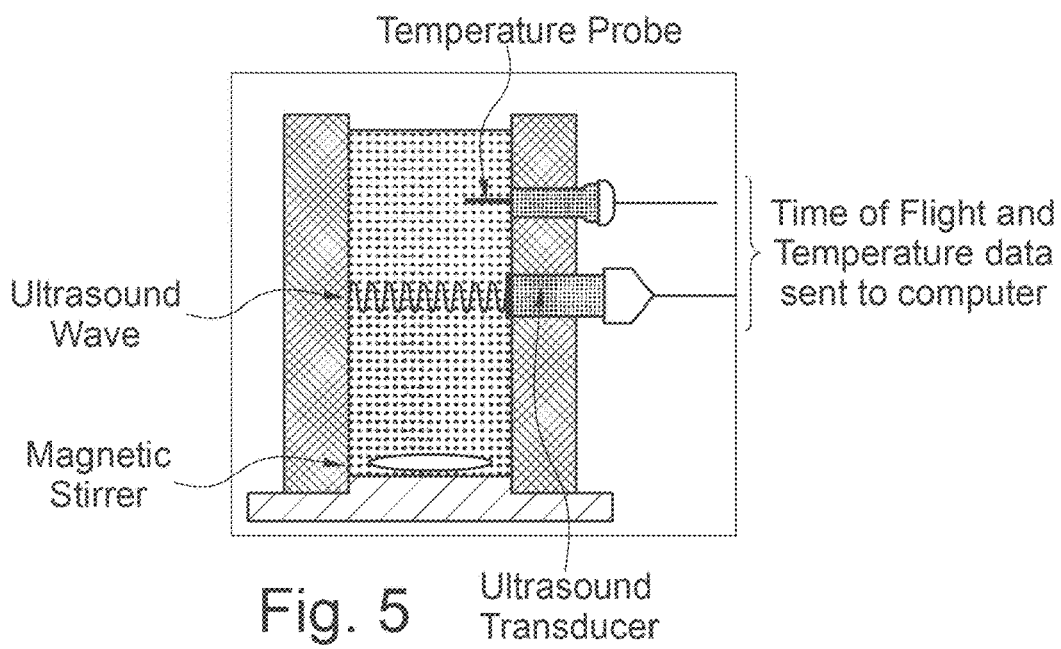
FIG. 5 is a diagrammatic illustration of the internals of the ultrasound cell.

FIG. 5 is a diagrammatic illustration of the internals of the ultrasound cell showing the cell wall (1) provided with an ultrasound transducer (2) which generates the ultrasound wave (3). The cell is equipped with a magnetic stirrer (4), a temperature probe (5) and means (6) and (7) for the transmission of details of operation of the cell to a data recorder system comprising the temperature display and logging a wave from generator and as shown in FIG. 3 amplifier.

The sample cell (B) was made of stainless steel and had a RTD centred 15 mm from the top (under the top level of the liquid) and the 2 MHz highly damped ultrasound transducer centred 37.5 mm from the bottom. The thermocouple and the ultrasound transducer were vertically aligned.

The sample cell dimensions are:

Height: 75 mm

Outside diameter: 66 mm

Inside diameter: 40 mm

Two sample cells were placed in the same cooling bath, one was connected to the continuous excitation source (waveform generator plus amplifier). The other was not sonicated. The equipment also has the ability to measure the speed and attenuation of sound in the sample and thereby monitor the crystal nucleation process.

A 15% (w/v) solution of eicosane (99% pure) was made up in a Heptane/Toluene mixture (80/20 v/v), (both 99% pure). Two samples were used in the experiment. Sample 1 was sonicated and Sample 2 was not.

The samples were stirred using magnetic "flea" stirrers set in reverse mode every 7 seconds.

The experiment investigated the impact of ultrasound on both the inhibition of crystal nucleation and the "reversing" of the process to dissolve the newly formed crystals. Hence the power levels were adjusted up and down as the sample was cooled.

The crystallisation or dissolution was observed optically. Qualitative observations were made regarding the crystal sizes and viscosity of the media.

The samples were cooled from 30° C. to 0° C. at 0.35° C./min. Cooling from 0° C. to −3.5° C. was at 0.15° C./min.

Observations were made at intervals or when there was a change in sample appearance such as crystal change and/or viscosity change.

|  | Sample 1 | | | | | Sample 2 | | | | |
| --- | --- | --- | --- | --- | --- | --- | --- | --- | --- | --- |
| Temp (° C.) | Frequency (MHz) | Power (W) | Crystals | Appearance | Qualitative Viscosity | Frequency (MHz) | Power (W) | Crystals | Appearance | Qualitative Viscosity |
| 10.0 | — | — | — | Clear | Fluid | — | — | — | Clear | Fluid |
| 8.0 | 2 | 1 | — | Clear | Fluid | — | — | — | Clear | Fluid |
| 7.0 | 2 | 1 | — | Clear | Fluid | — | — | large crystals | Cloudy | Fluid |
| 6.0 | 2 | 1 | v small crystals | Slightly cloudy | Fluid | — | — | large crystals | V cloudy, opaque | Gel |
| 5.8 | 2 | 20 | — | Clear | Fluid | — | — | large crystals | V cloudy, opaque | Gel |
| 4.8 | 2 | 20 | — | Clear | Fluid | — | — | large crystals | V cloudy, opaque | Gel |
| 4.0 | 2 | 10 | — | Clear | Fluid | — | — | large crystals | V cloudy, opaque | Gel |
| 4.0 | 2 | 5 | — | Clear | Fluid | — | — | large crystals | V cloudy, opaque | Gel |
| 3.7 | 2 | 4 | — | Clear | Fluid | — | — | large crystals | V cloudy, opaque | Gel |
| 2.3 | 2 | 3 | v small crystals | Slightly cloudy | Fluid | — | — | large crystals | V cloudy, opaque | Gel |
| 1.5 | 2 | 3 | v small crystals | Slightly cloudy | Fluid | — | — | large crystals | V cloudy, opaque | Gel |
| 1.0 | 2 | 5 | — | Clear | Fluid | — | — | large crystals | V cloudy, opaque | Gel |
| 0.5 | 2 | 5 | — | Clear | Fluid | — | — | large crystals | V cloudy, opaque | Gel |
| 0.0 | 2 | 2 | v small crystals | Slightly cloudy | Fluid | — | — | large crystals | V cloudy, opaque | Gel |
| −0.7 | 2 | 5 | — | Clear | Fluid | — | — | large crystals | V cloudy, opaque | Gel |
| −0.8 | 2 | 4 | — | Clear | Fluid | — | — | large crystals | V cloudy, opaque | Gel |
| −1.2 | 2 | 4 | — | Clear | Fluid | — | — | large crystals | V cloudy, opaque | Gel |
| −1.4 | 2 | 3 | — | Clear | Fluid | — | — | large crystals | V cloudy, opaque | Gel |
| −1.7 | 2 | 3 | v small crystals | Slightly cloudy | Fluid | — | — | large crystals | V cloudy, opaque | Gel |
| −1.7 | 2 | 4 | — | Clear | Fluid | — | — | large crystals | V cloudy, opaque | Gel |
| −2.0 | 2 | 3 | — | Clear | Fluid | — | — | large crystals | V cloudy, opaque | Gel |
| −2.3 | 2 | 2 | v small crystals | Slightly cloudy | Fluid | — | — | large crystals | V cloudy, opaque | Gel |
| −2.5 | 2 | 2 | v small crystals | Slightly cloudy | Fluid | — | — | large crystals | V cloudy, opaque | Gel |
| −2.5 | — | — | v small crystals | Slightly cloudy | Fluid | — | — | large crystals | V cloudy, opaque | Gel |
| −2.0 | — | — | v small crystals | Slightly cloudy | Fluid | — | — | large crystals | V cloudy, opaque | Gel |
| −0.5 | — | — | v small crystals | Slightly cloudy | Fluid | — | — | large crystals | V cloudy, opaque | Gel |
| 1.1 | — | — | v small crystals | Slightly cloudy | Fluid | — | — | large crystals | V cloudy, opaque | Gel |
| 1.7 | — | — | v small crystals | Slightly cloudy | Fluid | — | — | large crystals | V cloudy, opaque | Gel |
| 2.2 | — | — | v small crystals | Slightly cloudy | Fluid | — | — | large crystals | V cloudy, opaque | Gel |
| 3.3 | — | — | v small crystals | Slightly cloudy | Fluid | — | — | large crystals | V cloudy, opaque | Gel |
| 3.8 | — | — | — | Clear | Fluid | — | — | large crystals | V cloudy, opaque | Gel |
| 4.0 | — | — | — | Clear | Fluid | — | — | large crystals | V cloudy, opaque | Starting to move |
| 5.5 | — | — | — | Clear | Fluid | — | — | large crystals | Cloudy, opaque | Fluid |
| 7.8 | — | — | — | Clear | Fluid | — | — | small crystals | Almost clear | Fluid |
| 9.7 | — | — | — | Clear | Fluid | — | — | — | Clear | Fluid |

It should ne noted that the sonicating equipment or cell can be of any desired shape and size to optimise the ultrasound propagation for the particular application. For example, it may be flat, cylindrical or any other shape to provide the best effect. It should also be noted that the liquid my be quiescent, vibrated, stirred or flowed.

Conclusions: (Sonicated) Not Sonicated)

1. Viscosity and crystal size: The visible nature of the crystals were very different. The crystals were qualitatively much smaller in the sonicated Sample 1. The sonicated sample remained completely fluid down to (at least) the lowest test temperature (−2.5° C.). Whereas Sample 2 gelled 1° C. below the Wax Appearance Temperature (WAT) of 7° C. and did not revert to a fluid state until warmed to 5.5° C. Thus the sonicated Sample 1 remained fluid and moveable at least 9.5° C. lower than the non-sonicated Sample 2. It is anticipated that Sample 1 will remain fluid to a much lower temperature.
2. Inhibition of crystal nucleation: At power levels above 3 watts (W), the selected ultrasound frequency is capable of inhibiting the nucleation of Eicosane in solution as shown by the fact that without sonication the Wax Appearance Temperature (WAT)=7° C. Whereas with sonication it was WAT≤−2.0° C. This gives a Delta-WAT between the samples of ≥9° C.
3. Dissolution of crystals: Without sonication: The Wax Disappearance Temperature (WDT) is observed between 7.8° C. and 9.7° C. With sonication the WDT=3.8° C. This gives a Delta-WDT of between 4 and 5° C.

These results shows that the use of ultrasound at below cavitation frequency can be used to control many aspects of crystallisation from liquids.

Figure 6:
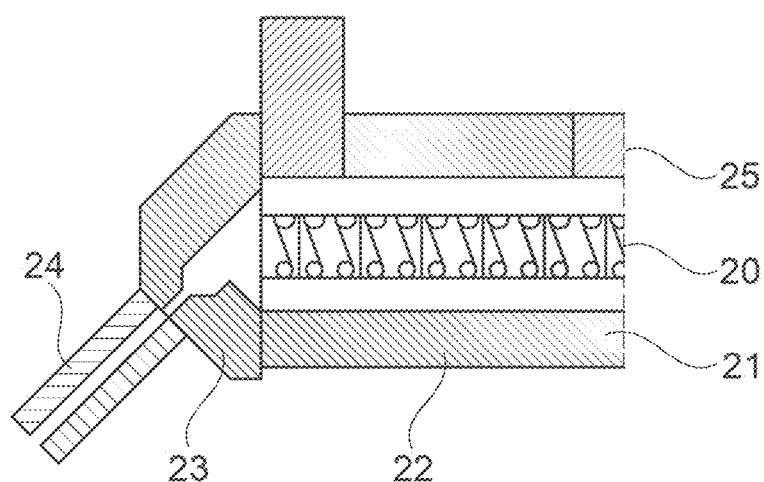
FIG. 6 shows an extruder according to the present teachings.

FIG. 6 shows how the invention may be applied to an extruder for the processing of molten thermoplastic materials and shows the end section of an extruder comprising a barrel (25) a screw or screws (20) several extruderzones (21 & 22) and an extrude die (23) provided with an ultrasound transducer (24) at the die which may be cooled.

In a further embodiment the invention therefore provides an extruder provided with an ultrasound transducer at or close to the extrusion die A transducer may be provided on other moulding equipment such as injection moulding machines and the invention further provides such plastic moulding, coating or film forming equipment provided with ultrasound transducers.

The invention claimed is:

1. A process for the control of crystal formation comprising applying ultrasound or acoustics at a level below that which causes cavitation, including stable cavitation and transient cavitation, to a metastable liquid to thereby control energy, mass balance, or both between particles and a liquid phase in the metastable liquid.
2. The process according to claim 1, wherein the level of the ultrasound or acoustic frequency, power and duration is tailored to promote or suppress crystal formation.
3. The process according to claim 1, wherein the ultrasound is employed at an MI level of 0.08 or less.
4. The process according to claim 1, wherein a rate of nucleation, crystallisation, dissolution, or a combination thereof is controlled.

5. The process according to claim 1, wherein a morphology of the crystals formed from the metastable liquid is controlled.

6. The process according to claim 1, wherein a habit of the crystals formed from the metastable liquid is controlled.

7. The process according to claim 1, in which the ultrasound or acoustics is of an intensity such that a hydrophone, when detecting sound radiated from the ultrasound or acoustics exposed metastable liquid, shows a signal pattern which is free from broad-band cavitation noise.

8. The process according to claim 7, wherein the ultrasound or acoustics intensity is at a level that the hydrophone when detecting sound radiated from the ultrasound exposed liquid, shows a view with a main signal corresponding with a main radiation frequency and a further signal corresponding with a first subharmonic frequency where an intensity peaks ratio of the further signal and the main signal, AS/AF, is <0.5.

9. The process according to claim 1, wherein the ultrasound or acoustics are in a frequency range between $f=500/10=50$ Hz (Acoustics) and $f=3000\times5/(100\times10-6)=150$ MHz (Ultrasound).

10. The process according to claim 1, wherein the ultrasound or acoustics are of peak power flux below 5 $kWm^{-2}$.

11. The process according to claim 1, wherein the ultrasound or acoustics are of average power flux below 5 $kWm^{-2}$.

12. The process according to claim 1, comprising controlling crystallisation of triglyceride fats, triglyceride oils, or a combination thereof.

13. The process according to claim 12, in which the triglyceride oils are of vegetable origin or animal oil and are selected from the group consisting of animal oils, rapeseed oil, corn oil, soybean oil, cottonseed oil, linseed oil, and olive oil.

14. A process for fractionating a triglyceride fat or triglyceride oil, which comprises the steps of:
   a. when the triglyceride fat or triglyceride oil is solid, heating the triglyceride fat or triglyceride oil until no substantial amount of solid triglyceride fat is present in the triglyceride oil, and
   b. allowing the triglyceride oil to cool and to crystallize and controlling the crystallisation by exposing the cooling fat to selective ultrasound or acoustics at a level below that which causes cavitation, including stable cavitation and transient cavitation, resulting in a solid fraction.

15. The process according to claim 14, for preparation of edible emulsion spreads.

16. The process according to claim 1, comprising tempering of chocolate.

17. A process comprising de-tempering of chocolate melt during re-work by application of ultrasound or acoustics power at a level below that which causes cavitation, including stable cavitation and transient cavitation, which melts crystal nuclei produced in a tempering operation without heating a liquid oil suspending phase.

18. The process according to claim 1, wherein said metastable liquid is a hydrocarbon liquid selected from the group consisting of fuels, lubricants, and waxes.

19. The process according to claim 1, for crystallisation of materials selected from pharmaceutical materials, energetic materials, agrochemicals, semiconductor materials, personal care products, and inorganic materials such as $TiO_2$ and $CaCO_3$.

20. The process according to claim 1, to control polymer crystallisation from a melt of a material that is being extruded, coated or moulded.

\* \* \* \* \*